United States Patent
Zhu et al.

(10) Patent No.: US 10,860,996 B2
(45) Date of Patent: *Dec. 8, 2020

(54) MOBILE DEVICE DISCOVERY AND INFORMATION DISTRIBUTION SYSTEM FOR AN INDICIA READER SYSTEM AT RETAIL ESTABLISHMENT

(71) Applicant: Hand Held Products, Inc., Fort Mill, SC (US)

(72) Inventors: Xiaoxun Zhu, Suzhou (CN); Hong Jian Jin, Suzhou (CN); Guoxiang Lv, Suzhou (CN); Junchi Yu, Suzhou (CN)

(73) Assignee: Hand Held Products, Inc., Fort Mill, SC (US)

( * ) Notice: Subject to any disclaimer, the term of this patent is extended or adjusted under 35 U.S.C. 154(b) by 238 days.

This patent is subject to a terminal disclaimer.

(21) Appl. No.: 15/833,267

(22) Filed: Dec. 6, 2017

(65) Prior Publication Data
US 2018/0174123 A1    Jun. 21, 2018

Related U.S. Application Data

(63) Continuation of application No. 13/581,788, filed as application No. PCT/CN2010/000497 on Apr. 15, 2010, now Pat. No. 9,842,327.

(51) Int. Cl.
*G06Q 20/20*    (2012.01)
*G06Q 20/32*    (2012.01)
*H04W 4/00*    (2018.01)

(52) U.S. Cl.
CPC .......... *G06Q 20/201* (2013.01); *G06Q 20/20* (2013.01); *G06Q 20/327* (2013.01); *H04W 4/00* (2013.01)

(58) Field of Classification Search
None
See application file for complete search history.

(56) References Cited

U.S. PATENT DOCUMENTS 8,694,443 B2 *    4/2014    Bobbitt ................. G06N 20/00
                                                     706/12
9,842,327 B2    12/2017    Zhu et al.
(Continued)

FOREIGN PATENT DOCUMENTS

CN        1335687 A      2/2002
CN      101394676 A      3/2009
(Continued)

OTHER PUBLICATIONS

First Office Action in related CN Application No. 201610447139.X dated Jan. 2, 2019, pp. 1-9.
(Continued)

*Primary Examiner* — Allen C Chein
*Assistant Examiner* — Denisse Y Ortiz Roman
(74) *Attorney, Agent, or Firm* — Alston & Bird LLP

(57) ABSTRACT

A retail store communications network, a point of transaction (POT) terminal and methods of using the same according to embodiments of the application can include a hand held and/or stationary optical reader for reading a bar code symbol of an item and generating a decoded out bar code data message. The network is configured so that the POT terminal can use linked or identified mobile devices by way of wireless communication, to provide a sequenced order of identified customers at the POT terminal among a plurality of discoverable wireless devices.

31 Claims, 3 Drawing Sheets

(56) References Cited

U.S. PATENT DOCUMENTS

| | | | |
|---|---|---|---|
| 2001/0023893 A1 | 9/2001 | Davies | |
| 2002/0123340 A1 | 9/2002 | Park | |
| 2002/0126845 A1 | 9/2002 | Hue et al. | |
| 2006/0046709 A1* | 3/2006 | Krumm | H04N 21/4126 455/422.1 |
| 2007/0138268 A1 | 6/2007 | Tuchman | |
| 2008/0085698 A1 | 4/2008 | Gamm | |
| 2008/0207296 A1 | 8/2008 | Lutnick | |
| 2008/0242220 A1 | 10/2008 | Wilson et al. | |
| 2010/0255787 A1* | 10/2010 | Wilson | H04M 1/7253 455/67.11 |
| 2011/0022443 A1* | 1/2011 | Partridge | G01C 21/20 705/14.64 |
| 2011/0178863 A1* | 7/2011 | Daigle | G06Q 30/0231 705/14.31 |
| 2013/0137375 A1 | 5/2013 | Wilson et al. | |
| 2014/0149873 A1 | 5/2014 | Wilson et al. | |

FOREIGN PATENT DOCUMENTS

| | | | |
|---|---|---|---|
| CN | 101682529 | A | 3/2010 |
| CN | 102934466 | B | 7/2016 |
| WO | 2011127627 | A1 | 10/2011 |

OTHER PUBLICATIONS

English-translation of First Office Action in related CN Application No. 201610447139.X dated Jan. 2, 2019, pp. 1-10.

First Chinese Office Action, Application No. 201080067446.6, dated Dec. 3, 2014, English Transaction provided, 13 pages.

Second Chinese Office Action, Application No. 201080067446.6, dated Aug. 21, 2015, 3 pages.

English-translation of Second Chinese Office Action, Application No. 201080067446.6, dated Aug. 21, 2015, 6 pages.

International Search Report for PCT/CN2010/00497 (now published as WO2011127627) dated Jan. 11, 2011, 3 pages {Previously submitted in parent application}.

International Preliminary Report on Patentability received for PCT Patent Application No. PCT/CN2010/000497, dated Oct. 26, 2012, 6 pages.

Notice of Allowance for U.S. Appl. No. 13/581,788 dated Aug. 9, 2017, 7 pages.

Notification of Grant for Chinese Application No. 201080067446.6, dated Apr. 4, 2016, 3 pages.

Office Action for U.S. Appl. No. 13/581,788 dated Feb. 23, 2017, 9 pages.

Office Action for U.S. Appl. No. 13/581,788 dated Jul. 8, 2016, 10 pages.

Advisory Action (PTOL-303) dated May 10, 2017 for U.S. Appl. No. 13/581,788.

Notice of Allowance and Fees Due (PTOL-85) dated Nov. 9, 2017 for U.S. Appl. No. 13/581,788.

Requirement for Restriction/Election dated Apr. 13, 2016 for U.S. Appl. No. 13/581,788.

* cited by examiner

MOBILE DEVICE DISCOVERY AND INFORMATION DISTRIBUTION SYSTEM FOR AN INDICIA READER SYSTEM AT RETAIL ESTABLISHMENT

CROSS REFERENCE TO RELATED APPLICATIONS

The present application claims the benefit of U.S. patent application Ser. No. 13/581,788 for a MOBILE DEVICE DISCOVERY AND INFORMATION DISTRIBUTION SYSTEM FOR AN INDICIA READER SYSTEM AT RETAIL ESTABLISHMENT filed May 21, 2013 (and published Sep. 26, 2013 as U.S. Patent Publication No. 2013/0254050), now U.S. Pat. No. 9,842,327, which claims the benefit of International Application No. PCT/CN2010/000497 for a MOBILE DEVICE DISCOVERY AND INFORMATION DISTRIBUTION SYSTEM FOR AN INDICIA READER SYSTEM AT RETAIL ESTABLISHMENT filed Apr. 15, 2010 (and published Oct. 20, 2011 as International Publication Number WO 2011/127627). Each of the foregoing patent applications, patent publications, and patent is hereby incorporated by reference in its entirety.

FIELD OF THE INVENTION

The application relates to retail store network in general and more specifically to mobile devices related to a point of sale transaction using data terminals capable of obtaining decodable indicia and frames of image data.

BACKGROUND OF THE INVENTION

In various retail commercial and industrial environments, the use of optical indicia, such as bar code symbols, has become the norm for identifying products and inventory. Typically, each item is marked with optical indicia associated with a description of the item and other attributes (for example, price) that are stored in a database of a host device or network system. Optical readers are used to read the optical indicia and provide that reading as input information to host devices. In some cases, the data is provided to the host devices via base units, which communicate with the optical reader. Examples of host devices include a computer (fixed or portable), a personal digital assistant (PDA), a portable data terminal (PDT), a point of sale (POS) terminal, a point of transaction (POT) terminal, a transaction terminal, cash register, or similar device. Checkout stations in retail environments use stationary presentation-type optical readers, (e.g., flat bed scanners, omni-directional bar code readers) mobile hand held optical readers hardwired to a base unit, mobile wireless hand held optical readers that communicate wirelessly with a linked base unit, or some combination of the above to read optical indicia such as bar code symbols, or bar codes. In some retail environments, the base unit then communicates this information to the cash register. Alternatively, the hand held optical reader can be connected directly to the cash register.

One delay in passing a customer through the transaction in the retail environment is identifying the customer to the cashier or POT terminal. One related art approach used for linking a retail checkout network to a customer is to scan (e.g., using an optical or magnetic reader) an identification card issued to the customer by the retail establishment. Generally, the identification card includes a bar code or magnetic data identifying the customer located on the back of the identification card. Alternatively, the customer can be identified to the retail checkout network by inputting the customer's phone number or other identifying criteria. However, such identification takes time and delays the processing of the customer at the transaction terminal by requiring additional actions of the cashier and/or the customer.

SUMMARY OF THE INVENTION

A wireless communication network of a retail business environment can provide additional capability to more rapidly complete transactions for customers or identify customers at point of transaction (POT) terminals or operations involving the same. An exemplary retail business communication system is a Bluetooth wireless communication system. A POT terminal can use RSSI values, which can indicate the Bluetooth signal strength, from communicating Bluetooth devices and determine the nearest device by the RSSI value. The POT terminal can exchange information with discovered devices to form an information distribution list. Selected discovered devices are identified as retail business environment internal devices and can be excluded from the information distribution list.

BRIEF DESCRIPTION OF THE DRAWINGS

Features described herein can be better understood with reference to the drawings described below. The drawings are not necessarily to scale, emphasis instead generally being placed upon illustrating the principles of the invention. In the drawings, like numerals are used to indicate like parts throughout the various views.

Thus, for further understanding of features of the application, reference can be made to the following detailed description, read in connection with the drawings in which.

DETAILED DESCRIPTION OF EXEMPLARY EMBODIMENTS

Figure 1:
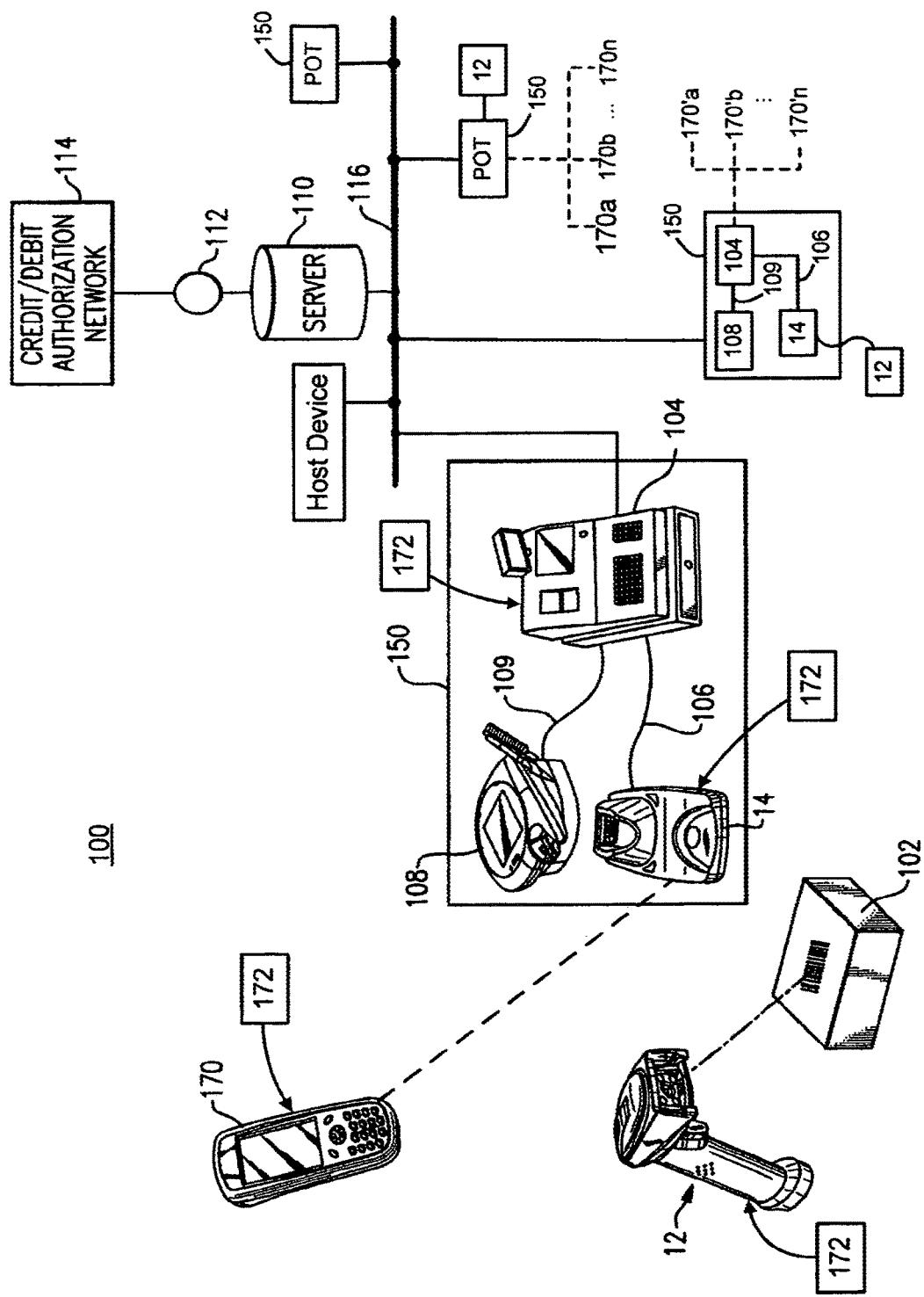
FIG. 1 is a block diagram of an exemplary retail store network in which an embodiment according to this application can be used.

Reference will now be made in detail to exemplary embodiments of the application, examples of which are illustrated in the accompanying drawings. As shown in FIG. 1, embodiments according to the present application can be used as part of a retail store network 100 at a point of transaction (POT) terminal 150. In the illustrative retail store network 100 of FIG. 1, the hand held optical reader 12 scans an item's 102 bar code symbol, decodes the information contained in the bar code symbol, and wirelessly communicates the decoded bar code data associated with that item 102 to the base unit 14 linked with the hand held optical reader 12. The base unit 14 then communicates that bar code data message to a host device such as a cash register 104, which can also be located at the POT terminal 150. For example, the cash register 104 can include a general purpose computer, controller, or processor. The base unit 14 communicates the decoded bar code data to the cash register 104 via a wireless connection or a hardwired connection 106 such as, for example, a USB connection, or a RS-232 serial connection to the cash register 104. Exemplary wireless communication for the POT terminal 150 can include but is not limited to wireless Bluetooth, IEEE 802.11b, ZigBee, Near Field Communication (NFC) or other standardized or proprietary RF system or device.

In addition to the hand held optical reader 12, the base unit 14, and the cash register 104, the POT terminal 150 may also include a transaction terminal 108 that is also connected to the cash register 104 via a wireless connection or a hard-wired connection 109 of the cash register 104. The transaction terminal 108 allows a customer to use a credit card or debit card, electronic benefits card, or customer loyalty card during or to complete a transaction at the POT terminal 150. In order to process the customer transaction, the transaction terminal 108 is connected to an in-store server 110 through a network backbone 116. The local server 110 may, through an appropriately configured gateway 112, be in communication with a remote server or additional networks including credit/debit authorization network 114. In response to an authorization request that includes a customer account number and a purchase amount, the credit/debit authorization network 114 through gateway 112 may, in one embodiment, either decline a requested purchase transaction or approve a requested purchase transaction. When credit/debit authorization network 114 approves a transaction, credit card company accounts, retailer accounts, and customer accounts are appropriately credited or debited. In addition to pricing information, the local server 110 could also communicate additional information about the item 102, including, for example, inventory information about the item 102, present or future promotions involving the item, or related accessories a customer may be interested in purchasing.

One or more mobile devices 170 (e.g., 170a, 170b, . . . , 170n) may be in wireless communication with the base unit 14, the hand held optical reader 12, the cash register 104, POT terminal 150 and/or the local server 110. An exemplary wireless communication system for communication between fixed or mobile devices 170 (or systems) is Bluetooth module technology implemented by wireless transceivers 172 disposed at the mobile devices 170. Similarly, the hand held optical reader 12, the base unit 14 or the cash register 104 can include the wireless transceiver 172, such as, for example a wireless Bluetooth transceiver using a standard or proprietary implementation. In one embodiment, each wireless transceiver 172 includes an RF module and an antenna and is configured to engage in two-way communication with at least one other wireless transceiver 172 or mobile device. Although described herein as Bluetooth transceiver 172, other standard or proprietary wireless technology can be implemented by the wireless device 170 (e.g., transceiver 172).

Returning to operations at the POT terminal 150, after the base unit 14 communicates an item's 102 bar code information received from the wireless optical reader 12 to the cash register 104, the cash register 104 communicates that information to the store server 110 that, among a variety of functions and responsibilities, may store in its memory or otherwise have access to a price lookup table. When the store server 110 receives the item's 102 bar code data message, it can correlate the price associated with that item 102 and communicate that price to the cash register 104.

According to embodiments of apparatus and methods thereof, a wireless communication capability of a retail business environment can provide additional capability to more rapidly present customers to desired purchases and/or process customer transactions (e.g., at POT terminals).

In an exemplary embodiment, an application or software can resides on a host device such as the optical reader 12 or its base unit 14 at the POT terminal 150 to which the base unit 14 is associated or connected. The application or software is responsible for identifying or retrieving from establishment database appropriate information to determine a small number of the closest mobile Bluetooth devices for a POT terminal 150 such as for checkout using the cash register 104 in the retail establishment. A Bluetooth host device can be a device implementing higher layers that can control a separate module providing the Bluetooth lower layers. For example, if a general purpose computer or portable computer has a Bluetooth card operable, the computer is the host device and the Bluetooth card is the module. In one embodiment, the application or software is responsible to determine the next customer to be processed at the POT terminal 150 from the plurality of customers that have Bluetooth devices using the retail establishment Bluetooth network. By identifying the next customer to be processed before the customer reaches the POT terminal 150, transactions can be made faster, overall costs of POS transactions can be reduced and/or a customer satisfaction can be increased.

For example, in an exemplary business environment embodiment, a retail establishment can have one or more establishment wireless communication device, each to establish communications to customer mobile devices using a Bluetooth wireless protocol establish a wireless communication link between the two. For example, upon entering the retail establishment the customer can be alerted to participation in a Bluetooth network via a query to the customer's mobile device 170 (by visual, audible, or tactile indicator) and decide whether to establish the link or not.

In one embodiment, mobile devices (e.g., customers) can be detected and linked to the establishment wireless Bluetooth network upon entering the retail establishment. For example, a first mobile Bluetooth device can enter the business enterprise operating in a Bluetooth Broadcast mode. In the Broadcast mode, the first mobile Bluetooth device can transmit messages, including the name of the first mobile Bluetooth device 172x as well as the address of its wireless transceiver 172x, to inform any nearby Bluetooth devices that first mobile Bluetooth device 170x is available for linking. Another device, such as a host device or establishment communication device in the retail store network 100, and set in Discovery Mode, can be informed of the first mobile Bluetooth device 170x. Acting as a Bluetooth Master, the host device can initiate the linking process of the wireless transceivers by communicating its address to the first mobile Bluetooth device 170x. After the first mobile Bluetooth device 170x and the host device have been linked, information can be transmitted between the Bluetooth devices. Bluetooth devices can transmit information such as device name, device class, a list of services, device features, manufacturer, Bluetooth specification used, clock offset, and other information on demand. When the first mobile Bluetooth device 170x no longer wishes to operate in linked communication with the host device, the Bluetooth communication can be broken.

A point to point link is between a master Bluetooth device and a slave Bluetooth device. A point to multi-point communication link is between a master Bluetooth device and up to seven Bluetooth devices in a wireless user group. The wireless user group of up to eight devices is called a piconet. However, a master Bluetooth device in one piconet can be a slave Bluetooth device in another piconet to form scatter nets having greater than eight Bluetooth participants and increased complexity.

In one embodiment, the local server 110 can track all mobile devices 170 participating in the wireless Bluetooth network (or networks) of the retail establishment. The local server 110 can be linked to host devices (at POT terminals 150 or elsewhere) using the network backbone 116. A first host device operating at a first POT terminal 150 can be implemented at the base 14, the cash register 104 or the like. Accordingly, the first host device at the first POT terminal 150 can be communicating with a first plurality of mobile devices 170'a, 170'b, . . . , 170'n within range. The first plurality of mobile devices, 170'a, 170'b, . . . , 170'n, is a subset of the mobile devices 170 physically inside the retail establishment or a subset of mobile devices 170 participating in the wireless Bluetooth network of the retail establishment.

The first host device can determine a relative distance to each of the first plurality of mobile devices 170'a, 170'b . . . 170'n using the Receive Signal Strength Indication (RSSI) value from each of the first plurality of mobile devices 170'a, . . . , 170'n. In one embodiment, the first host device can determine a relative distance to each of the first plurality of mobile devices 170'a, . . . , 170'n and initiate communication starting with the closest and proceeding in turn to the next closest in the order of increasing physical distance therebetween using the RSSI values. The first host device can initially send information to the nearest mobile device $170'_{nearest}$. For example, the host device can use a Read RSSI command. In one embodiment, a Bluetooth device may be concurrently connected to several other Bluetooth devices with different distances and/or different received qualities therebetween, and accordingly, the RSSI may be different on each link. Therefore, a request RSSI value message can use as a parameter a connection handle to identify which link's RSSI is being read. Further, transmit power and/or receive strength can be used transmitted and used to determine the relative distances between. For example, a Read_Transmit_Power_Level command takes a connection handle parameter to specify which link's transmit power level is being read. In one embodiment, a transmit power level command can be used to read both the current transmit power level and a maximum power level at which the Bluetooth device can transmit according to a requested type parameter. Requested power levels can be returned in a corresponding acknowledgment message such as Command_Complete event. Exemplary power levels used for the RSSI can be communicated in units of dBm.

According to embodiments of the application, the first host device at the first POT terminal 150 can then determine a relative location using RSSI signals from the first plurality of mobile devices (e.g., customers) 170'a, 170'b, . . . , 170'n. The first host device can then determine a next customer by identifying one mobile device $170_{next}$ as being the next customer at the first POT terminal 150 using the relative locations determined for the first plurality of mobile devices 170'a, 170'b, . . . , 170'n. For example, the first host device can identify the mobile device $170_{next}$ based on its having a highest RSSI value, the closest position, being located within a prescribed area adjacent or nearby the first host device, or having multiple RSSI values or positions resulting in a highest correspondence to the first host device among the plurality of first mobile devices 170'a, 170'b, . . . , 170'n. In one embodiment, a rate of change of RSSI values or a weighted average of RSSI values can be used to prioritize or determine a mobile device position by a POT terminal 150. An operator at the first POT terminal 150 can confirm the identity of the next customer (e.g., mobile device $170_{next}$) upon initiating the transaction.

In an alternative embodiment, the host device can divide the first plurality of mobile devices 170'a, 170'b, . . . , 170'n into separate lists before determining the next customer $170_{next}$. For example, the host device can further operate to try and reduce the number of the first plurality of mobile devices 170'a, 170'b, . . . , 170'n down to a limited number (e.g., 5). For example, the first host device can divide the first plurality of mobile devices 170'a, 170'b . . . 170'n so that one list is customers and another list can be "internal devices". For example, "internal devices" can include employees (sales people or managers) or the like. In one embodiment, the list of customers and "internal devices" can be separated by frequency of detection of a corresponding mobile device 170. The frequency of the mobile devices 170 detection can be used because when one mobile device 170 is discovered very frequently (e.g., every day or multiple times per day), then the determination can be an "internal device" and to be excluded from the customer list. For example, the host device can provide a graphical user interface (GUI) to allow the operator to view the plurality of first mobile devices 170'a, 170'b, . . . , 170'n as separate lists with customers in the sequenced order for their respective transactions. The operator of the host device can confirm a switch of an individual mobile device 170 to the internal device.

In an exemplary embodiment, a location of the participants in the Bluetooth network can be monitored and the customer position (e.g., order) can be correlated to each of the plurality of POT terminals 150. In one embodiment, each POT terminal 150 is coupled to the Bluetooth network and/or a computer such as the local service 110 monitoring the Bluetooth network to receive the identification of each customer to be processed at the corresponding cash register 104.

An embodiment of a method of initiating a transaction in a retail store according to the application will now be described. The method embodiment shown in FIG. 2 can be implemented in, and will be described using the retail store network embodiment shown in FIG. 1, however, the method embodiment is not intended to be limited thereby.

Figure 2:
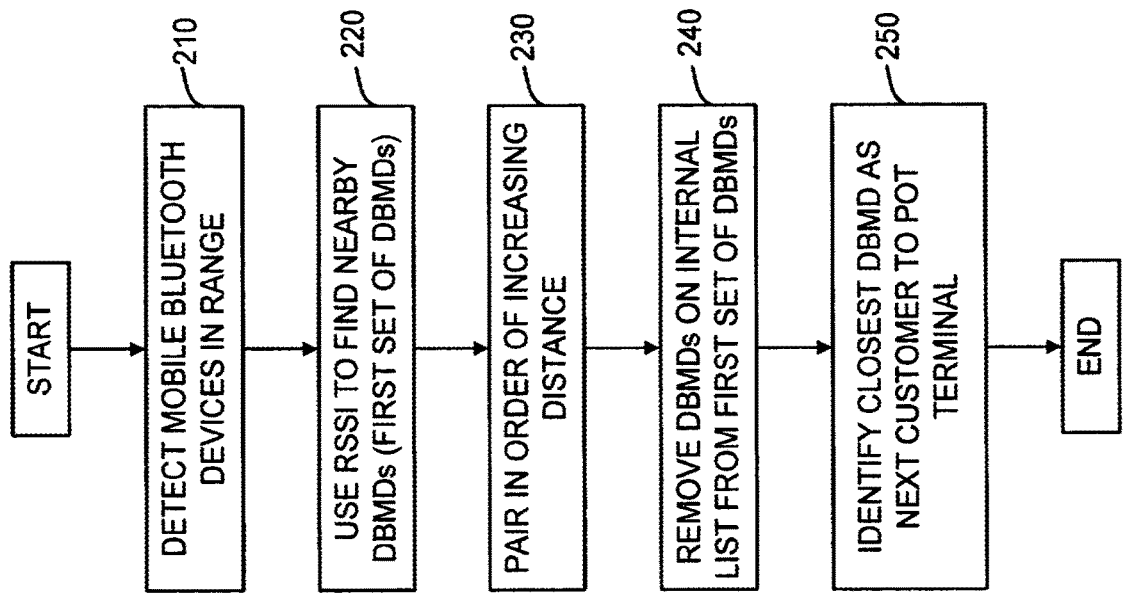
FIG. 2 is a flow diagram illustrating operations of an embodiment of a method of operating a transaction terminal according to the application.

As shown in FIG. 2, after a process starts, a first host device at the first POT terminal 150 can detect (e.g., Bluetooth discovery process) mobile Bluetooth devices (DMBDs) carried by customers within range of the first host device (operation block 210). The first host device at the first POT terminal 150 can request RSSI values, which can indicate the Bluetooth signal strength, from the DMBDs and determine which of the DMBDs are nearby mobile Bluetooth devices using the RSSI values (operation block 220). The first host device then begins pairing with a closest DMBD of the nearby DMBDs and can send customer identification data for the paired DBMD. The first host device at the first POT terminal 150 can pair and exchange information with a prescribed number (e.g., 3, 5, 10) of the nearby DMBDs (operation block 230). The first host device can remove selected ones of the linked nearest DMBDs when they are determined to be on a retail store "internal device" list. For example, employee Bluetooth mobile devices can be on the "internal device" list (operation block 240). The first host device can identify the closest one of the nearest DBMDs as a next customer of the first POT terminal 150 and provide the customer identification (e.g., using data exchanged while paired) to the POT terminal 150 to increase a speed of processing customers at the POT terminals of the retail store (operation block 240). In one embodiment, the RSSI value can be obtained before additional information is exchanged (operation block 250).

Another embodiment of a method of initiating a transaction in a retail store according to the application will now be described. The method embodiment shown in FIG. 3 can be implemented in, and will be described using the retail store network embodiment shown in FIG. 1, however, the method embodiment is not intended to be limited thereby.

Figure 3:
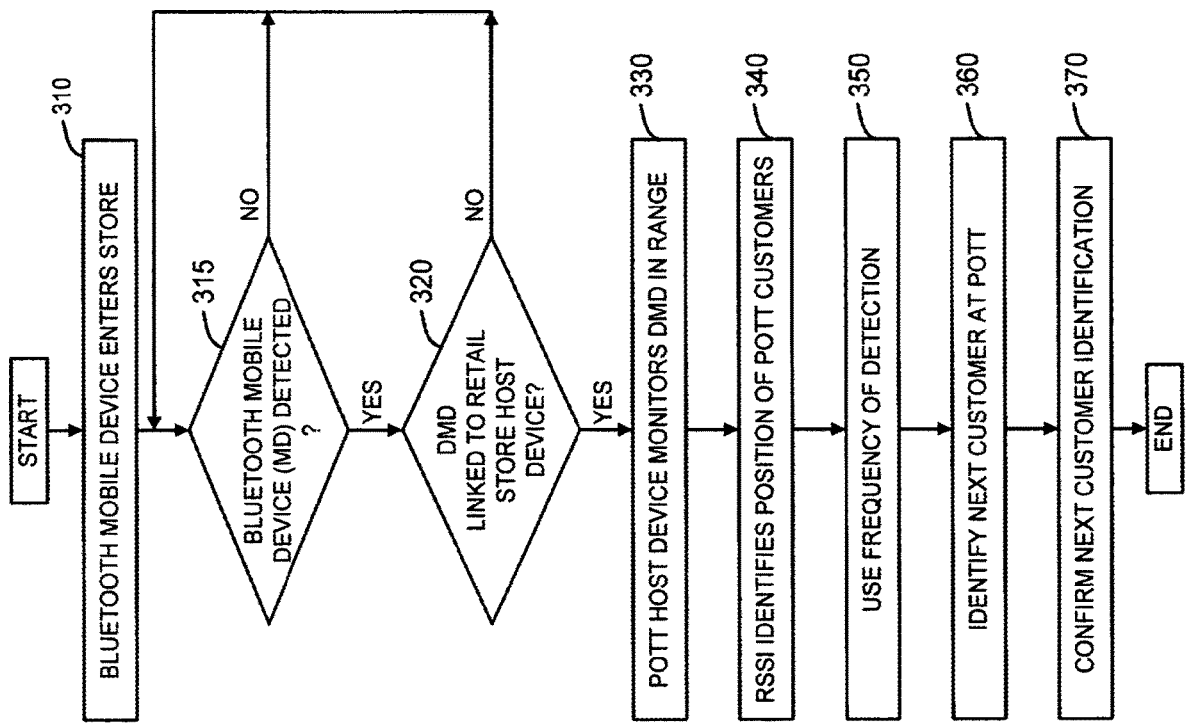
FIG. 3 is a flow diagram illustrating operations of an embodiment of a method of operating a transaction terminal according to the application.

As shown in FIG. 3, after a process starts, a customer enters a retail store carrying a mobile device equipped with a wireless communication capability, such as a Bluetooth or other communication modules and comes within the communication range of the store communication system (operation block 310). A first Bluetooth host device of the store, for example, loaded on a general purpose computer or PC located near a store entrance and/or store exit can monitor and detect customers entering/leaving the store with Bluetooth mobile devices (operation block 315). For example, the detection in operation block 315 can be made repeatedly, periodically, intermittently, or responsive to an operator action or a sensed condition.

Upon detection of the Bluetooth mobile device, the first Bluetooth host device then attempts to pair with the customer's Bluetooth enabled mobile device (operation block 320). In one embodiment, the first Bluetooth host device can attempt to pair by sending a request message to a customer's Detected Mobile Device (DMD). The customer can accept the request to pair. The first Bluetooth host device then pairs with the customer DMD and sends the customer mobile device identification data, which can be stored by both the first host device and the customer mobile device (operation block 320, Yes). The identification data can be further sent to a Bluetooth network controller (not shown) coupled to the wireless network or the local/store server 110. In one embodiment, the local server 110 can monitor the location of a first plurality of customers having DMD within the store (e.g., all customers having DMD in the store) and the eventual exit of each customer having its DMD connected to the retail store Bluetooth network.

The POT terminal (POTT) 150 can have a second host device (e.g., in the cash register 104) that can monitor a second plurality of customers having DMD within range of the second host device (operation block 330). The second host device can determine a position or relative location of each of the second plurality of customers by receiving an RSSI signal from the second plurality of customers (operation block 340). Control can then continue to operation block 350 where the number of second plurality of customers can be reduced by using a frequency of detection.

In operation block 350, for example, the second plurality of customers can be grouped into a plurality of lists including but not limited to a checkout customers list, and an internal device list for employees of the retail store and delivery or service personnel. In one embodiment, the internal device list can be determined by frequency of detection. For example, an employee would have a mobile device (e.g., DMD) that was detected virtually every day. A supervisory employee can have a mobile device that is detected more than once per day. In contrast, a customer would enter the retail store infrequently.

By monitoring the position using the RSSI signal of the mobile devices in the customer list, the POT terminal 150 can identify a customer using the DMD before that customer reaches the cash register 104 to complete the transaction (operation block 360). Customer identification can be provided to the operator or cashier for the transaction (operation block 370). Optionally, additional information regarding the identified customer can be supplied to the cashier or cash register 104 with the customer identification. From operation block 370, the process can end.

In one embodiment, additional RSSI signals from other host devices (e.g., at other POT terminals 150 or additional store host devices) can be used to supplement position determination by the second host device (operation block 340). If three or more RSSI values for separate links are obtained for at least one mobile device 170, the local server or a processor and perform triangulation processes to determine a position.

Although exemplary embodiments were described using a list of nearby mobile devices and a list of internal devices, additional lists can be used according to the application. Such list can be maintained using tables or linked lists at a host device or remote or local server. Exemplary lists can include a master list, a list for each POT terminal, a list of DMD having RSSI values for multiple links, additional customer information lists such as but not limited to legal age limit lists or a group mobile devices list. For example, in a group mobile device list, multiple people can shop together each with a DMD, but only one mobile device is a potential customer and the other DMD should be ignored (e.g., a parent and two children having Bluetooth devices can be together in the retail store, but only one DMD is a potential customer).

Many of the services offered over Bluetooth can expose private data or allow the connecting party to control the Bluetooth device. For security reasons it is therefore necessary to control which devices are allowed to connect to a given Bluetooth device. At the same time, it is useful for Bluetooth devices to automatically establish a connection without user intervention as soon as they are in range.

To resolve this conflict, Bluetooth used a process called pairing. Two devices need to be paired once to communicate with each other; the pairing process is typically triggered automatically the first time a device receives a connection request from a device it is not yet paired with. Once a pairing has been established, it is remembered by the devices, which can then connect to each without user intervention. When desired, the pairing relationship can later be removed by the user.

Pairs of Bluetooth devices can establish a relationship by creating a shared secret known as a link key in a process known as pairing. Exemplary pairing mechanisms or protocols include Legacy pairing, Secure Simple pairing, Passkey Entry, Out of Band (OOB) pairing or the like. Secure Simple pairing uses a form of public key cryptography wherein no user interaction is required but a device may prompt the user to confirm the pairing process.

Passkey Entry pairing used between a device with a display and a device with numeric keypad entry (such as a keyboard), or two devices with numeric keypad entry. In the first case, the display is used to show a numeric code to the user, who then enters the code on the keypad. In the second case, the user of each device enters the same number. OOB pairing uses an external means of communication (such as NFC) to exchange some information used in the pairing process. Pairing is completed using the Bluetooth radio, but requires information from the OOB mechanism.

However, although some Bluetooth services can require either encryption or authentication, as such require pairing before they allow a remote device to use the given service. Some services, such as an Object Push Profile, elect not to explicitly require authentication or encryption so that pairing does not interfere with the user experience associated with the service use-cases. If a link key is stored by both Bluetooth devices, then the Bluetooth devices are said to be bonded. A device that wants to communicate only with a bonded device can cryptographically authenticate the identity of the other device, and so be sure that it is the same device it previously paired with. Once a link key has been generated, an authenticated ACL link between the devices may be encrypted so that the data that they exchange over the airwaves is protected against eavesdropping.

Every Bluetooth device has a unique address that is generally not shown in inquiries. Instead, public or friendly Bluetooth names may be used, which may be set by a user. This public name appears when another user scans for Bluetooth devices and lists of paired devices. Most mobile devices have the Bluetooth name set to the manufacturer and model of the phone by default. Most phones and laptops show only the Bluetooth names and special programs may be used to get additional information from remote devices.

It will be appreciated by those of ordinary skill in the art that although the hand held optical reader 12 is described as separate functional components, the functions of any of the separate components may be combined. Further, the optical readers disclosed herein can include a scan engine for decoding optical indicia. The scan engine in an exemplary optical reader that may be a laser scanning engine or an image capture device.

Embodiments according to the application were described as capable of reading or processing bar codes. Without loss of generality, the exemplary optical readers can be any device capable of reading optical indicia, such as an information bearing indicia (IBI) or dataforms that is machine readable, such as a 1-D barcode, a 2-D barcode, a 1-D stacked barcode, a logo, glyphs, color-codes, and the like.

Embodiments according to the application described with respect to programs, processes, methods and apparatus herein are not related or limited to any particular type of computer or network apparatus (hardware or software and/or network structure such as PAN, LAN, WAN. Various types of general purpose or specialized computer apparatus may be used with or perform operations in accordance with the teachings described herein. While various elements of the exemplary embodiments have been described as being implemented in software, in other embodiments hardware or firmware implementations may alternatively be used, and vice-versa.

A small sample of systems and methods that are described herein is as follows:

A. A system of a retail store network can include:

an establishment communication device configured for wirelessly communicating with mobile communication devices transported by users within the communication range of the establishment communication device, the establishment communication device to provide a customer ID to each of a first plurality of mobile devices of the mobile communication devices.

a point of transaction terminal, comprising:

a hand held bar code reader for reading a bar code symbol of an item and generating therefrom a decoded out bar code data message;

a base unit for receiving said decoded out bar code data message from said hand held bar code reader, said base unit including a second wireless transceiver;

a cash register for receiving said decoded out bar code data message from said base unit, said cash register coupled to said base unit; and a host device coupled to the hand held bar code reader, the base unit, or the cash register, the host device including a second wireless transceiver;

a server for receiving said decoded out bar code data message from said cash register, said server coupled to said cash register and storing a price lookup table for correlating said decoded out bar code data message to price information;

wherein the host device is configured to detect a second plurality of mobile devices within range of the host device from the first plurality of mobile devices, determine a third plurality of mobile devices as a subset of the second plurality of mobile devices using frequency of detection by the host device, and identify a next customer at the transaction terminal using a position of the third plurality of mobile devices determined using RSSI values and the customer ID provided by the establishment wireless network; and wherein said network is configured so that said hand held bar code reader reads said bar code symbol and transmits said decoded out bar code data message using said first wireless transceiver, said base unit receives said decoded out bar code data message using said second wireless transceiver and transmits said decoded out bar code data message to said cash register, which sends said decoded out bar code data message to said server, which returns to said cash register price information correlated with said bar code data message.

B. A method of initiating a transaction, including:

wirelessly transmitting from an establishment communication device a request to pair with a mobile communication device being transported by a user within communication range of the establishment communication device;

accepting by the user the request to pair;

pairing the establishment communication device utilizing a pairing protocol;

linking the mobile communication device with a customer identification;

wirelessly transmitting identifying data from the establishment communication device to the mobile communication device to establish a first plurality of users of a wireless communication network;

detecting a second plurality of users within range of a second establishment communication device, where the second establishment communication device corresponds to a transaction terminal;

generating a sequenced order of users to process at the transaction terminal;

from RSSI values corresponding to the plurality of second users using the second establishment communication device; and identifying a next customer from a next user at the transaction terminal using the customer identification from the establishment communication device.

While the present invention has been described with reference to a number of specific embodiments, it will be understood that the true spirit and scope of the invention should be determined only with respect to claims that can be supported by the present application. Further, while in numerous cases herein wherein systems and apparatuses and methods are described as having a certain number of elements it will be understood that such systems, apparatuses and methods can be practiced with fewer than the mentioned certain number of elements. Also, while a number of particular embodiments have been set forth, it will be understood that features and aspects that have been described with reference to each particular embodiment can be used with each remaining particularly set forth embodiment. For example, aspects and/or features of embodiments described with respect to FIG. 2 can be combined with aspects or features of embodiments described with respect to FIG. 1.

We claim:

1. A network comprising:
an establishment communication device configured for wirelessly communicating with mobile communication devices transported by users within the communication range of the establishment communication device, the establishment communication device configured to provide a customer ID to each of a first plurality of mobile devices from the mobile communication devices; and
a host device configured (i) to wirelessly detect a second plurality of mobile devices within range of the host device, the second plurality of mobile devices being a subset of the first plurality of mobile devices, (ii) to determine a third plurality of mobile devices as a subset of the second plurality of mobile devices using frequency of detection to exclude mobile devices comprising internal devices within range of the host device from the third plurality of mobile devices, and (iii) to identify position of each of the mobile devices of the third plurality of mobile devices from the host device using RSSI values obtained from the third plurality of mobile devices.

2. The network of claim 1, wherein the host device is communicably coupled to a point of transaction terminal to identify a next customer at the point of transaction terminal using the RSSI values and the customer ID, wherein the RSSI values is further used to determine a relative position of the mobile devices to the host device at the point of transaction terminal.

3. The network of claim 2, wherein the point of transaction terminal comprises:
a hand held bar code reader for reading a bar code symbol of an item and generating therefrom a decoded out bar code data message;
a base unit for receiving the decoded out bar code data message from the hand held barcode reader; and
a cash register for receiving the decoded out bar code data message from the base unit;
wherein the host device is coupled to the hand held bar code reader, the base unit, and/or the cash register.

4. The network of claim 3, a server for receiving the decoded out bar code data message from the cash register, the server coupled to the cash register and storing a price lookup table for correlating the decoded out bar code data message to price information.

5. The network of claim 4, wherein the network is configured so that (i) the hand held bar code reader reads the bar code symbol and transmits the decoded out bar code data message to the base unit, (ii) the base unit receives the decoded out bar code data message and transmits the decoded out bar code data message to the cash register, (iii) the cash register sends the decoded out bar code data message to the server, and (iv) the server returns price information correlated with the decoded out bar code data message to the cash register.

6. The network of claim 1, wherein the network is configured so that the establishment communication device has a linking mode in which an identification address of the establishment communication device is exchanged with the mobile communication devices to identify the first plurality of mobile devices as participating in the network.

7. The network of claim 1, wherein RSSI values received from the third plurality of mobile devices within range are used to determine a sequenced, increasing-distance order of the third plurality of mobile devices relative to the host device.

8. The network of claim 1, wherein the host device is configured to determine whether a member of the second plurality of mobile devices is an employee by assessing whether the frequency of detection is greater than a first threshold rate of detection.

9. The network of claim 1, comprising:
a second point of transaction terminal including a second host device, wherein an RSSI value is wirelessly received by the second host device from each of the third plurality of mobile devices; and
a third point of transaction terminal including a third host device, wherein an RSSI value is wirelessly received by the third host device from each of the third plurality of mobile devices;
wherein the RSSI values are used to determine a sequenced order of the third plurality of mobile devices at the point of transaction terminal with corresponding customer IDs.

10. The network of claim 9, wherein the RSSI values are used to determine a sequenced order of the third plurality of mobile devices at the first point of transaction terminal, the second point of transaction terminal and the third point of transaction terminal.

11. The network of claim 9, wherein the RSSI values are used to identify a next customer at the first point of transaction terminal, the second point of transaction terminal, and the third point of transaction terminal using a plurality of RSSI values for each next customer.

12. A network comprising:
one or more host devices configured to:
    detect a first plurality of mobile devices within a range of the one or more host devices;
    detect a second plurality of mobile devices as a subset of the first plurality of mobile devices to exclude mobile devices comprising internal devices from the first plurality of mobile devices using frequency of detection;
    identify a position of each mobile device of the second plurality of mobile devices from the one or more host devices using RSSI values obtained from the second plurality of mobile devices;
    determine a third plurality of mobile devices as a subset of the second plurality of mobile devices using frequency of detection to exclude mobile devices comprising internal devices within range of the one or more host devices from the third plurality of mobile devices, and
    identify a position of each of the mobile devices of the third plurality of mobile devices from the host device using RSSI values obtained from the third plurality of mobile devices.

13. The network of claim 12, comprising:
an establishment communication device configured for wirelessly communicating with mobile communication devices transported by users within the communication range of the establishment communication device, the establishment communication device provides a customer ID to each of the first plurality of mobile devices from the mobile communication devices and to confirm using the customer ID when completing a transaction at the point of transaction terminal.

14. The network of claim 12, wherein the position of each of the second plurality of mobile devices includes a relative position of each of the second plurality of mobile devices to the one or more host devices of a point of transaction terminal, wherein the relative position is a position history over a 15 second, 30 second, or 1 minute interval.

15. The network of claim 12, wherein the first plurality of mobile devices are defined as non-excluded mobile devices and excluded mobile devices after excluding the internal devices from the first plurality of mobile devices, and wherein an RSSI value received from each of the non-excluded mobile devices within the range is used to determine a sequenced increasing distance order of the second plurality of mobile devices to the one or more host devices.

16. The network of claim 12, wherein the one or more host devices are configured to determine that a member of the first plurality of mobile devices is transported by an employee when the frequency of detection is greater than a first threshold of detections per day, wherein the member determined as transported by the employee comprises an excluded mobile device of the excluded mobile devices.

17. The network of claim 13, wherein the point of transaction terminal comprises a first point of transaction terminal, the retail store network further comprising:
a second point of transaction terminal including a second host device including a third wireless transceiver, wherein an RSSI value is received by the second host device from each of the second plurality of mobile devices; and
a third point of transaction terminal including a third host device including a fourth wireless transceiver, wherein an RSSI value is received by the third host device from each of the second plurality of mobile devices, where the RSSI values from each of the non-excluded mobile devices along with corresponding customer IDs are used to determine a sequenced order of the non-excluded mobile devices at the first point of transaction terminal.

18. The network of claim 17, where the RSSI values from each of the non-excluded mobile devices along with corresponding customer IDs are used to determine a sequenced order of the non-excluded mobile devices at the first point of transaction terminal, the second point of transaction terminal, and the third point of transaction terminal.

19. The network of claim 17, where the RSSI values along with a plurality of RSSI values for each next customer are used to identify a next customer at the point of transaction terminal, the second point of transaction terminal, and the third point of transaction terminal.

20. A system comprising:
a first plurality of mobile communication devices,
a second plurality of mobile communication devices, and
a point of transaction terminal, comprising:
a hand held bar code reader for reading a bar code symbol of an item and generating therefrom a decoded out bar code data message;
a base unit for receiving said decoded out bar code data message from said hand held bar code reader, said base unit including a second wireless transceiver;
a cash register for receiving said decoded out bar code data message from said base unit, said cash register coupled to said base unit; and
a host device coupled to the hand held bar code reader, the base unit, or the cash register, the host device including a first wireless transceiver, and wherein the host device is configured to:
detect the first plurality of mobile communication devices within a range of the host device,
detect the second plurality of mobile communication devices as a subset of the first plurality of mobile communication devices to exclude mobile communication devices comprising internal devices from the first plurality of mobile communication devices using frequency of detection, wherein the second plurality of mobile communication devices are defined as an internal list of mobile devices and a nearby mobile device list after excluding the internal devices from the second plurality of mobile communication devices, and
identify a relative position of each mobile communication device of the second plurality of mobile communication devices from the host device using RSSI values obtained from the second plurality of mobile communication devices;
determine a third plurality of mobile communication devices as a subset of the second plurality of mobile communication devices using frequency of detection to exclude mobile communication devices comprising internal devices within range of the host device from the third plurality of mobile communication devices, and
identify a position of each of the mobile communication devices of the third plurality of mobile communication devices from the host device using RSSI values obtained from the third plurality of mobile communication devices.

21. The system of claim 20, wherein each of the first and second plurality of mobile communication devices transmits one of device name, device class, a list of services, device features, device manufacturer, communication specifications used, clock offset, and their combinations to the host device.

22. The system of claim 20, wherein the host device is further configured to identify the relative position of each mobile communication device of the second plurality of mobile communication devices to the host device at the point of transaction terminal using transmit power levels obtained from the second plurality of mobile communication devices.

23. The system of claim 22, wherein the host device may receive both a current transmit power level and a maximum transmit power level of the second plurality of mobile communication devices.

24. The system of claim 22, wherein the relative position of the second plurality of mobile communication devices to the point of transaction terminal is determined using one of a rate of change of RSSI values and weighted average of RSSI values.

25. The system of claim 20, wherein the second plurality of mobile communication devices are further defined into additional lists based on one of legal age limit and potential customers.

26. A method comprising:
wirelessly communicating from an establishment communication device with mobile communication devices transported by users within the communication range of the establishment communication device, the establishment communication device configured to provide a customer ID to each of a first plurality of mobile devices from the mobile communication devices;
wirelessly detecting, by a host device, a second plurality of mobile devices within range of the host device, the second plurality of mobile devices being a subset of the first plurality of mobile devices;
determining a third plurality of mobile devices as a subset of the second plurality of mobile devices using frequency of detection to exclude mobile devices comprising internal devices within range of the host device from the third plurality of mobile devices; and identifying positions of each of the mobile devices of the third plurality of mobile devices from the host device using RSSI values obtained from the third plurality of mobile devices.

27. The method of claim 26, further comprising:
initiating a transaction by:
wirelessly transmitting from an establishment communication device a request to pair with a mobile communication device being transported by a user within communication range of the establishment communication device;
accepting by the user the request to pair;
pairing the establishment communication device utilizing a pairing protocol;
linking the mobile communication device with a customer identification;
wirelessly transmitting identifying data from the establishment communication device to the mobile communication device to establish a first plurality of users of a wireless communication network;
detecting a second plurality of users within range of a second establishment communication device, wherein the second establishment communication device corresponds to a transaction terminal;
generating a sequenced order of users to process at the transaction terminal from the RSSI values corresponding to the plurality of second users using the second establishment communication device; and
identifying a next customer from a next user at the transaction terminal using the customer identification from the establishment communication device.

28. The method of claim 27, further comprising:
confirming the customer identification of the next customer with the next customer; and
using the customer identification when completing the transaction.

29. The method of claim 27, comprising:
plotting a plurality of historical positions for each of the plurality of second users using corresponding historical RSSI values; and
determining the next user using a correlation comparison of historical positions for the plurality of customers.

30. The method of claim 27, wherein an RSSI value received from each of the plurality of second users within range are used to determine a sequenced increasing distance order of the plurality of second users.

31. The method of claim 27, wherein the detecting the plurality of customers from the plurality of users comprises:
determining an identity for each of the plurality of users through communication with the server;
determining a frequency of detection for each identified user; and
determining the user is an employee when the frequency of detection is greater than a first threshold of detections per day.

* * * * *